Sept. 11, 1923.
C. E. FISHER
1,467,364
BRUSH MAKING MACHINE
Original Filed March 22, 1920    6 Sheets-Sheet 2
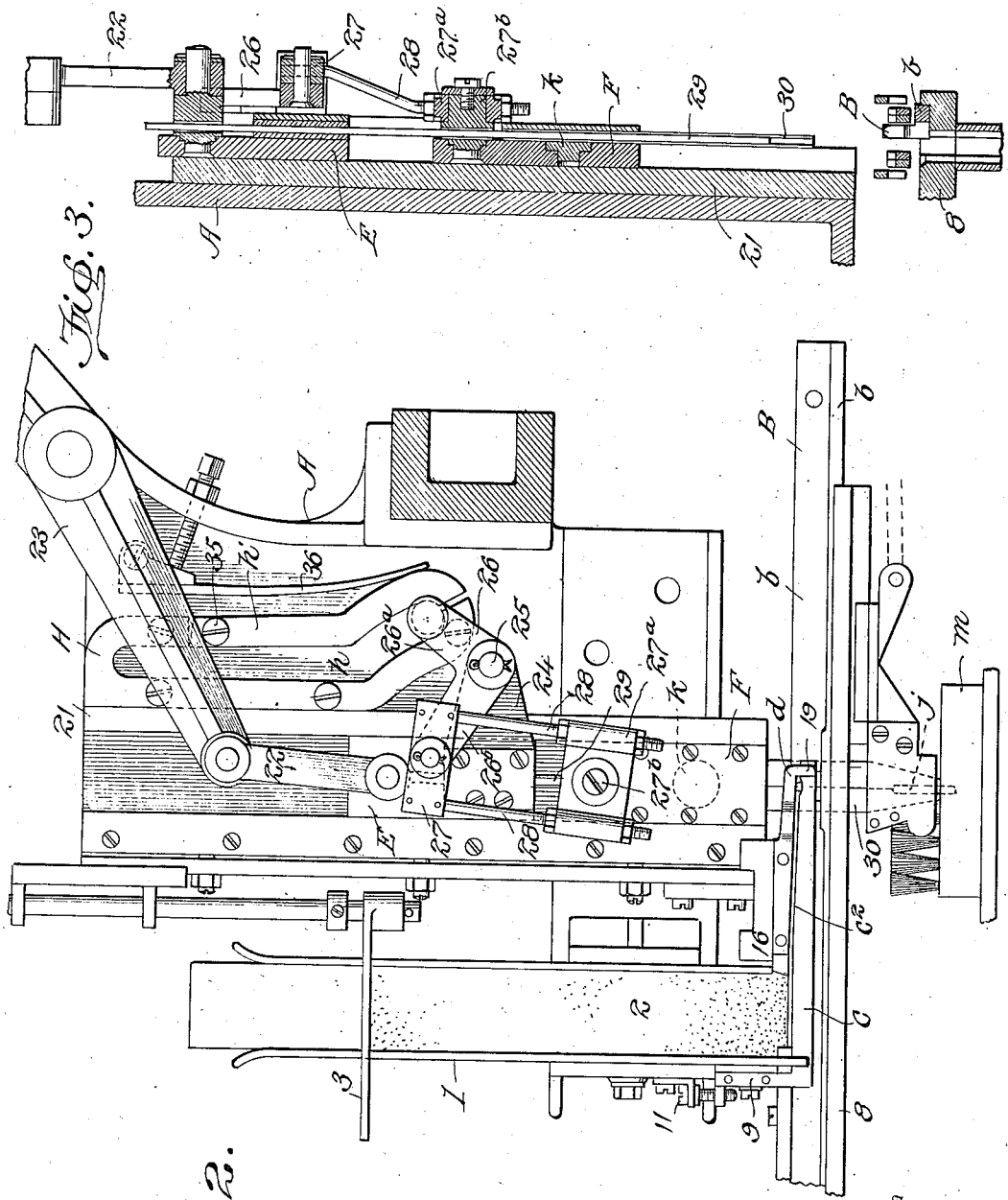

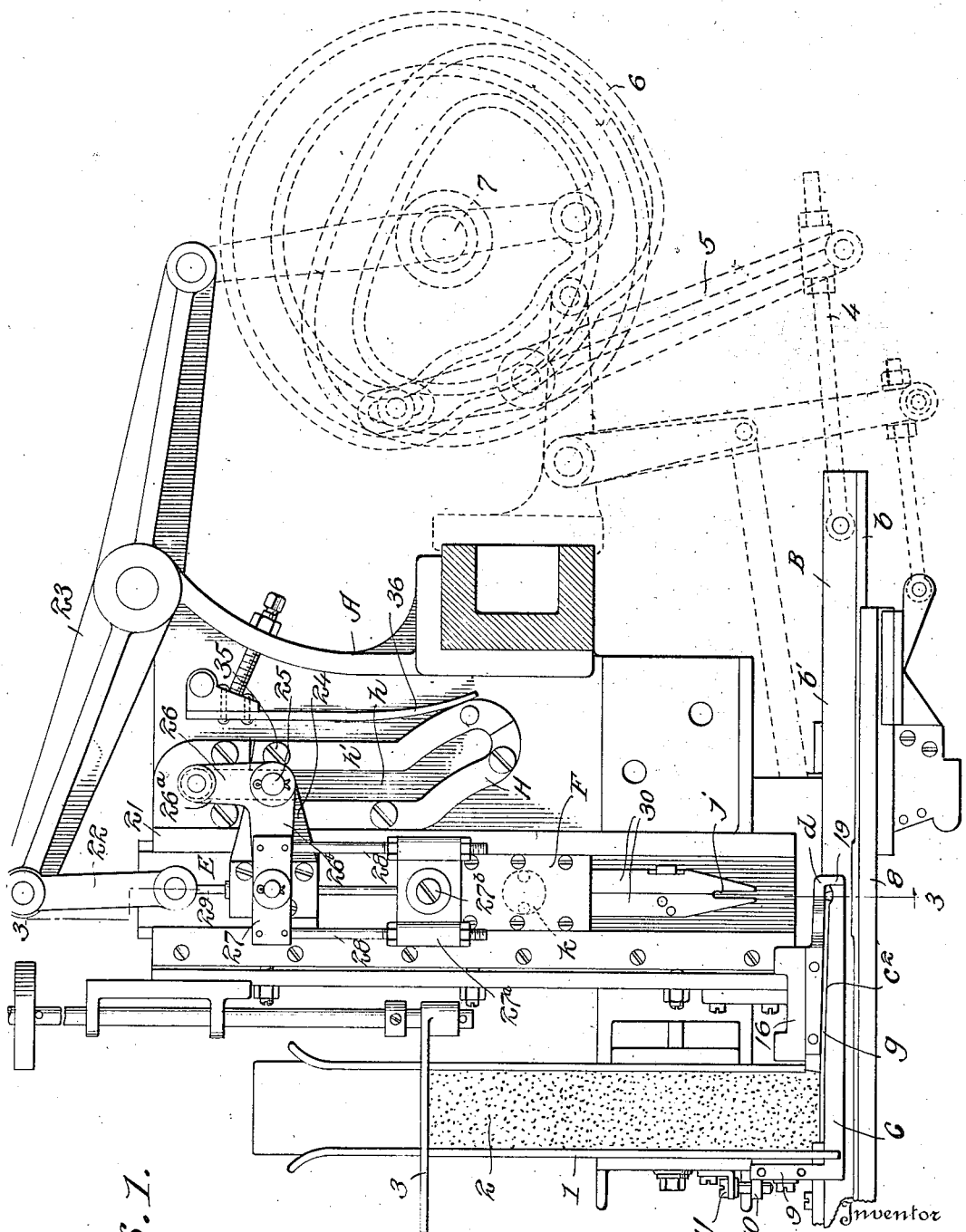

Sept. 11, 1923.

C. E. FISHER

BRUSH MAKING MACHINE

Original Filed March 22, 1920   6 Sheets-Sheet 3

1,467,364

Inventor
Charles E. Fisher

By
Robert Watson
Attorney

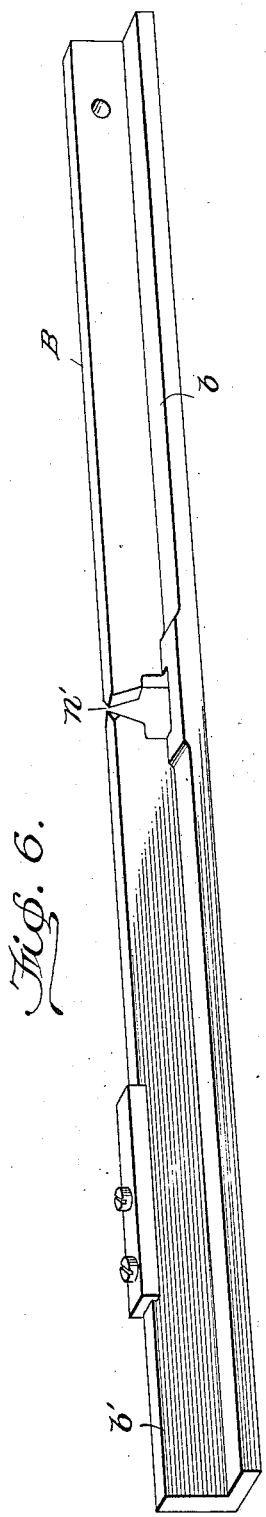
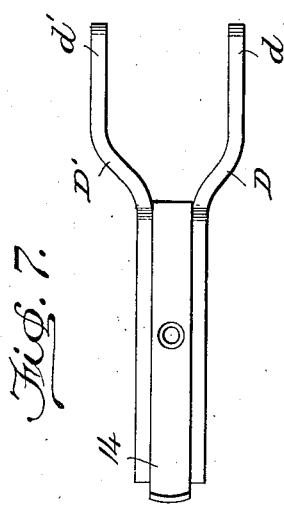
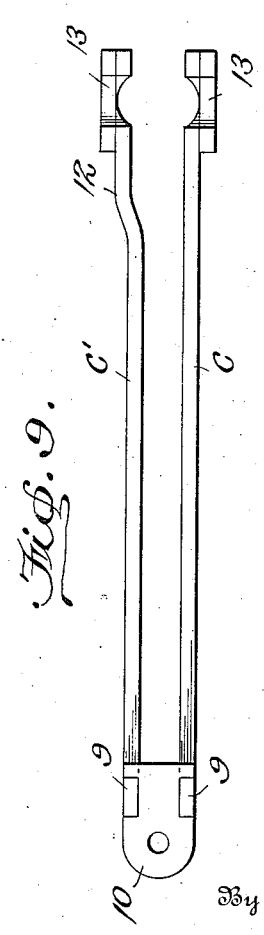
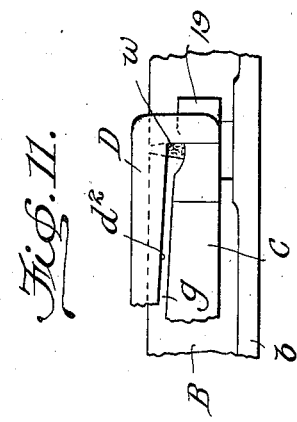
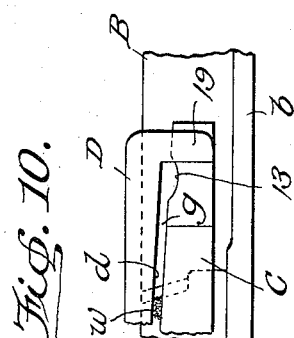
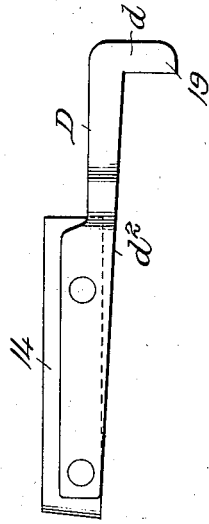
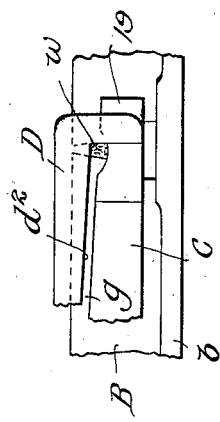
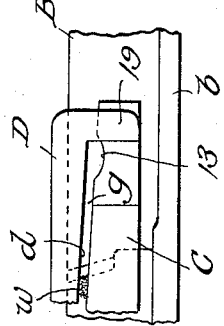

Sept. 11, 1923.   1,467,364
C. E. FISHER
BRUSH MAKING MACHINE
Original Filed March 22, 1920   6 Sheets-Sheet 5
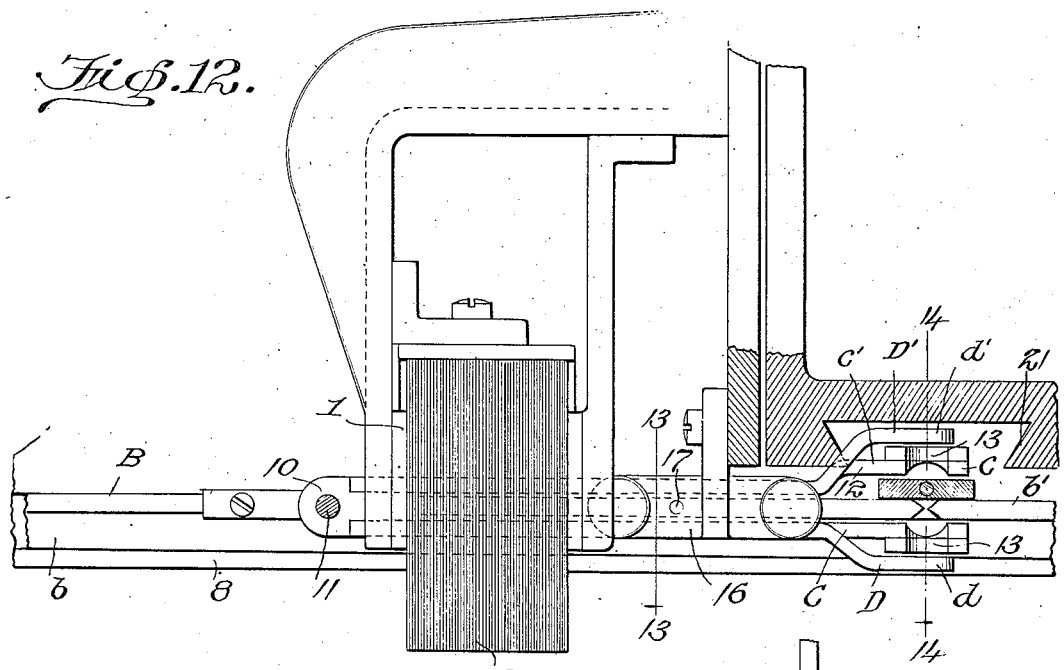
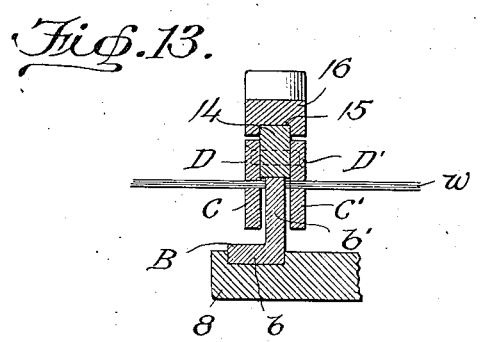
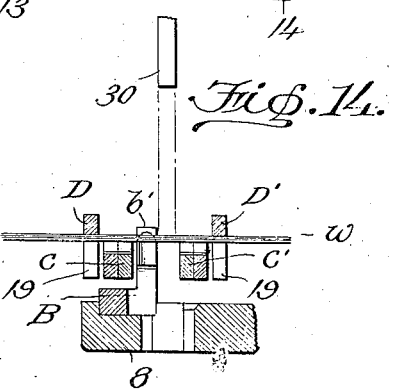
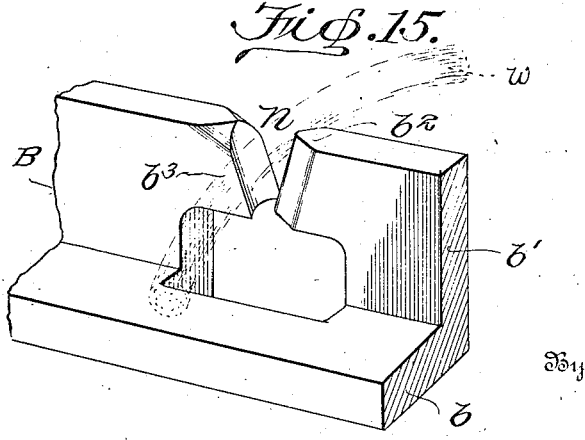
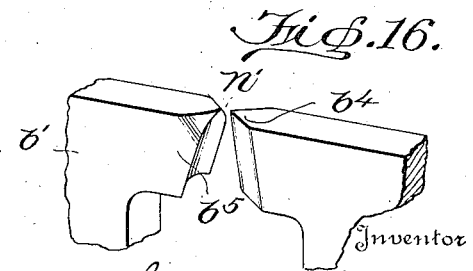
Inventor
Charles E. Fisher
Robert Watson
Attorney

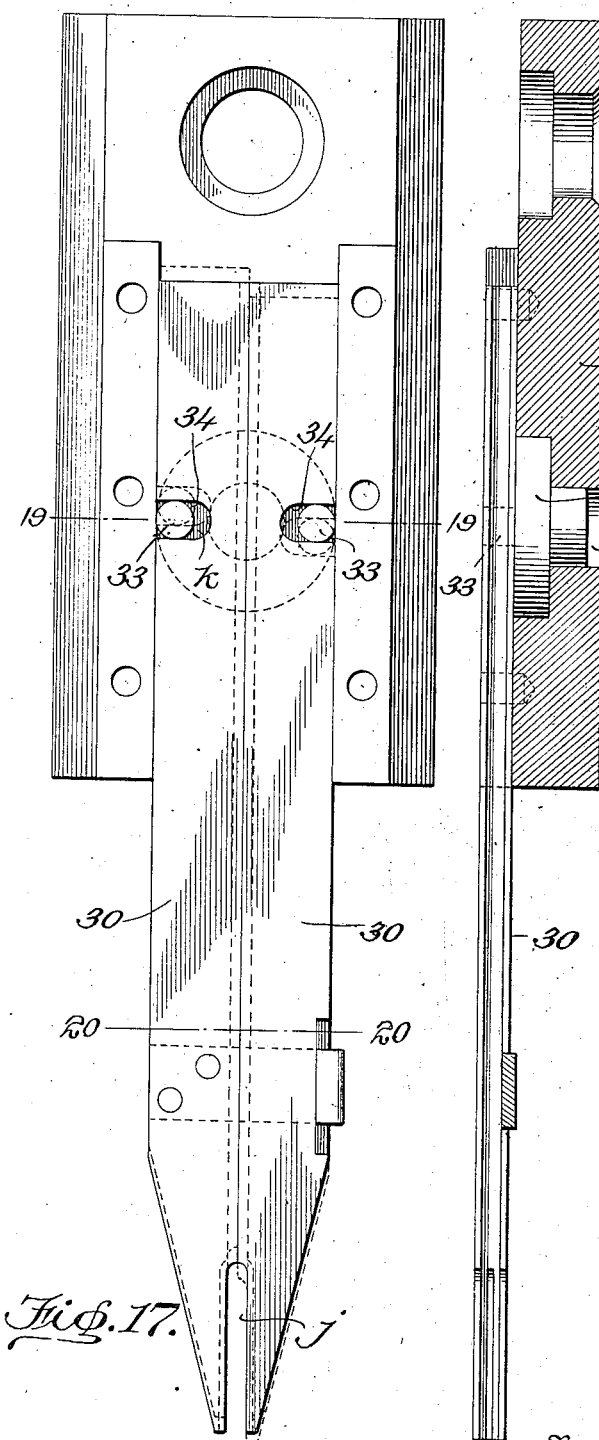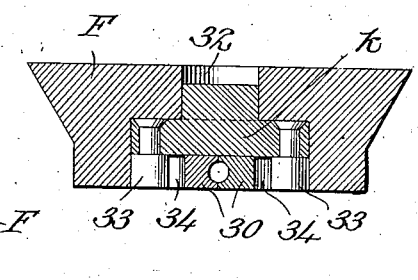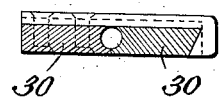

Patented Sept. 11, 1923.

1,467,364

UNITED STATES PATENT OFFICE.

CHARLES E. FISHER, OF BALTIMORE, MARYLAND, ASSIGNOR TO THE FISHER AUTOMATIC BRUSH MACHINE COMPANY, A FIRM COMPOSED OF CHARLES E. FISHER AND EDWIN ROLKER.

BRUSH-MAKING MACHINE.

Application filed March 22, 1920, Serial No. 367,816. Renewed June 2, 1923.

*To all whom it may concern:*

Be it known that I, CHARLES E. FISHER, a citizen of the United States, residing at Baltimore, in the State of Maryland, have invented certain new and useful Improvements in Brush-Making Machines, of which the following is a specification.

This invention relates to improvements in brush-making machines, and particularly to means for collecting wisps from the fiber magazine and to the means for applying tufts to the brush blocks. The type of machine to which my invention relates is illustrated in the patent to Young, No. 578,907, dated March 16, 1897.

In said patent, there is shown a two-part slide for collecting wisps of fiber or bristle from a magazine and conveying them to a stapling mechanism, the two parts of the slide being relatively movable and having cut-out portions which form a notch. This notch is automatically opened when the slide is moved forward, to receive the fibers from the magazine, and closed, to retain the wisp, while the slide is moving backward to the stapling mechanism and during the stapling operation. When the wisp arrives opposite the stapling mechanism, a notched stop-plate is moved into position to straddle the central portion of the wisp and to compress it into shape to fit between the prongs of a staple which is then driven downward by stapling devices into the brush block.

One part of my invention relates to an improved means, applicable to the machine of said patent, for collecting and conveying the wisps, whereby a single-piece slide having a permanently open notch may be employed instead of the two-part slide above mentioned, and whereby the wisps are collected in a more positive way and with less loss of fiber, and whereby the wisps are pressed into form to be straddled by the staple without requiring moving parts other than the slide.

In said patent, the stapling mechanism comprises upper and lower vertically movable slides, the former carrying a rod for driving the staples and the latter carrying parallel guides for said rod which also serve to carry the staples and the tufts to the brush block. The slides are connected to one another through devices which cause them to travel together during the first part of the downward stroke and to move relatively to one another during the last part of the stroke, in order that the upper slide may continue its movement, to drive the staple, after the guides on the lower slide have engaged the brush block and positioned a staple over a hole in the block. Each of said slides in the patent referred to has a movement of definite length at each stroke, and in order that said parallel guides may both engage the brush blocks when the latter are arranged at an angle to the horizontal, the guides are movable relatively to one another and to the lower slide, and they have a spring connection with the latter, which causes the guides to yieldingly engage the blocks and compensates for variations in the thickness of the blocks.

The spring connections referred to between the lower slide and the relatively movable guides for the staple and staple-driving rod are objectionable for various reasons, and in order to make a more positive connection between said guides and slide, I provide a wrist-plate on the lower slide and pivotally connect said guides to said wrist-plate at opposite sides of its center. With this arrangement, if the brush block is arranged in an inclined position, when the stapling devices descend, the one of said guides which is first arrested by engagement with the block will, through the wrist-plate, cause the other guide to be quickly thrown into engagement with the block. In order to provide for blocks which may be thicker than the standard blocks, or which may have high parts on the backs which raise the faces of the blocks above the normal heights of the blocks when resting upon their support, I provide a yielding part in the connections between the upper and lower slides whereby the travel of the lower slide may be shortened without injury to the apparatus. Thus, in the present apparatus, the staple guides are positively driven by the lower slide, but the travel of the latter slide is variable according to the thickness of the brush block.

In the accompanying drawing,

Fig. 1 is a side elevation of the tufting mechanism of a brush machine, illustrating my improvements;

Fig. 2 is a similar view, showing the tuft-inserting devices in lowered position;

Fig. 3 is a section on the line 3—3 of Fig. 1;

Fig. 6 is a perspective view of the tuft-gathering and carrying slide having a notch suitable for tampico and similar fibers;

Fig. 7 is a top plan view of the upper wisp guide;

Fig. 8 is a side view of the same;

Fig. 9 is a top plan view of the lower wisp guide;

Fig. 10 is a detail showing the wisp-gathering and carrying slide with a wisp of fiber approaching the delivery point;

Fig. 11 is a similar view showing the wisp at the delivery point;

Fig. 12 is a horizontal section about on the line 12—12 of Fig. 4;

Fig. 13 is a section on the line 13—13 of Fig. 12;

Fig. 14 is a section on the line 14—14 of Fig. 12;

Fig. 15 is a perspective view of a part of a tuft-gathering and carrying slide having a notch suitable for bristles;

Fig. 16 is a similar view showing a notch suitable for tampico and similar fibers;

Fig. 17 is a front elevation of the vertically movable staple-applying guides;

Fig. 18 is a central vertical section through the same;

Fig. 19 is a section on the line 19—19 of Fig. 17; and

Fig. 20 is a section on the line 20—20 of Fig. 17.

Figure 4:
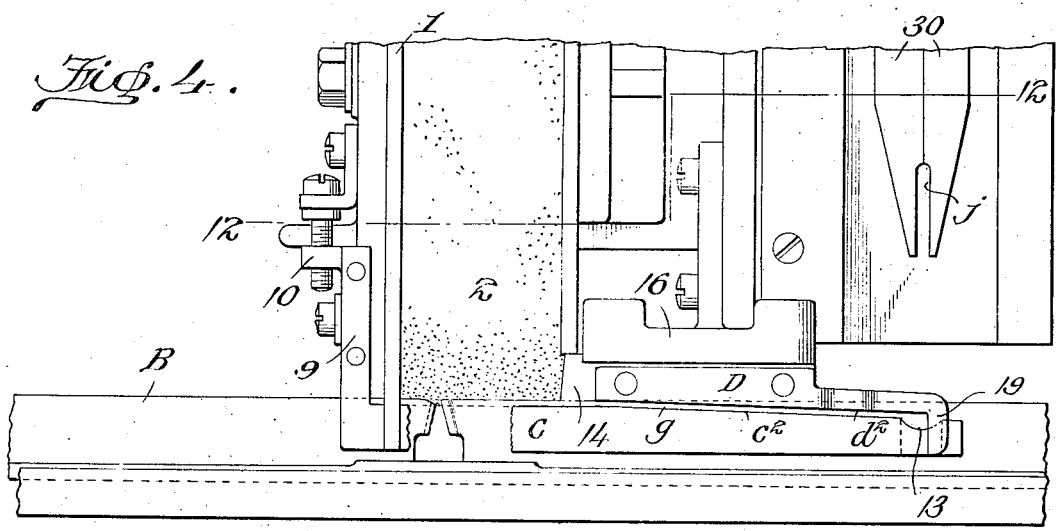
Fig. 4 is a side view, on an enlarged scale, of the lower part of the fiber magazine and adjacent parts, showing the tuft-gathering and carrying slide in the gathering position.

Referring to the drawing, A indicates a part of the supporting frame upon which the tufting mechanism is mounted. Upon the frame is arranged a magazine 1, for containing the loose fibers or bristles 2, which are all cut to the same length and arranged parallel in the magazine. These fibers or bristles are pressed downward by a follower 3, and the central portion of the column of fibers rests upon a sliding bar B, which is provided with a notch, as hereinafter described, for gathering wisps of fiber from the magazine and conveying them to the stapling mechanism.

The sliding bar B is moved back and forth by means of a link 4, Fig. 1, which is connected to a lever 5, which is rocked by a cam wheel 6, mounted upon a driving shaft 7, these operating parts being indicated in dotted lines in Fig. 1.

The sliding bar B, as shown best in Fig. 6, is L-shape in cross section. One part $b$ slides in a groove in a fixed base 8, as shown in Figs. 12—14, while the other part $b'$ of the bar B extends vertically upward in the form of a blade. This blade has a notch extending downward from its upper surface for receiving a wisp of fiber from the magazine when the notched portion of the bar is moved forward, or to the left in Fig. 1, under the magazine. Bars having different forms of notches are used, according to the character of the material which is used to form the tufts. Thus, in Fig. 15, is shown a notch $n$ which is wider at the top than at the bottom, and this form of notch is found most effective for gathering wisps of the stronger and more elastic materials, such as bristles; while in Fig. 16, the notch $n'$ is wider at the bottom than at the top, and this latter form of notch is found more desirable for collecting inelastic or dead materials, such as tampico. The jaws of the notch may be integral with the bar, or separately formed and rigidly secured to the bar, the jaws remaining in fixed relation to one another. The form and arrangement of the jaws are important. Thus, in Fig. 15, the face of the jaw $b^2$ is convex, being substantially V-shaped, while the opposing face of the jaw $b^3$ is concave, and the upper end of this latter jaw is rounded or beveled inwardly from the sides and top. When the bar is moved forward, that is, from right to left in Fig. 1, as the notch travels beneath the fiber magazine the V-shaped jaw $b^2$ presses against the central portions of the strands and a wisp of bristles $w$ collects in the notch. Because of the shape of the opposing jaws of the notch, the bristles fall readily into the notch during the forward movement of the bar, the wisp taking a curved form, as indicated in dotted lines in Fig. 15, and as the bar moves back the bristles tend to straighten and bind in the notch. As the bar returns, this wisp is carried from beneath the magazine to the stapling mechanism, the guides hereinafter referred to holding the wisp in the notch and causing the central portion of the wisp to be compressed and shaped to be straddled by the staple which secures it to the brush block. In Fig. 16, it will be noted that the jaw $b^4$ is similar to the jaw $b^2$ in Fig. 15, except that it slopes oppositely, and that the jaw $b^5$ is similar to the jaw $b^3$, but slopes oppositely, the two jaws in Fig. 16 forming a notch which is narrower at the top than at the bottom.

Close to the sides of the notched gathering blade are arranged two stationary guides C and C', shown detached in Fig. 9, each of said guides having upward extensions 9, which are secured to the opposite sides of a block 10, vertically adjustable by means of an adjusting screw 11, at the rear of the fiber magazine. These guides, which may be termed the lower wisp guides, extend close to the sides of the tuft-gathering blade for some distance from the magazine, their upper edges $c^2$ being slightly below the upper edge of the tuft-gathering blade. The upper edges of these guides also incline downwardly with respect to the upper surface of the blade from a point adjacent the magazine to the ends of the guides, as clearly shown in Figs. 4 and 5. The guide C extends parallel with the side of the tuft-gathering blade throughout its length, and the guide C' lies parallel with and close to the blade throughout the greater portion of its length, the end of this guide being offset from the blade, as shown at 12, and the ends of both guides are formed with arcuate recesses 13 in their upper edges. Above these lower wisp guides are arranged what may be termed upper wisp guides D and D', shown in detail in Figs. 7 and 8. These upper wisp guides consist of metal strips which are secured to opposite sides of a short metal bar 14, which latter rests upon the blade of the wisp-gathering bar. The upper part of the bar or block 14 fits into a groove 15 in a spring housing 16, secured to the frame, and it is held from sliding in the groove by means of a pin 17. Springs 18, Fig. 5, in said housing, bear upon the bar 14 and hold it in contact with the wisp gathering blade. The guides D and D' extend from a point adjacent the fiber magazine parallel with the sides of the wisp gathering blade for some distance and are then offset outwardly in opposite directions, their end portions $d$ and $d'$, respectively, lying at the sides of the end portions of the lower wisp guides and terminating in downwardly extended parts 19, which form stops for the wisps. The lower edges $d^2$ of the guides D and D' incline downwardly with respect to the top of the wisp-gathering blade from a point adjacent the magazine, and the inclined edges $d^2$ and $c^2$ of the upper and lower wisp guides form guide grooves $g$ for the wisps as they are carried along in the notch of the wisp-gathering blade. When a wisp is being carried away from the magazine, in the notch, the end portions of the wisp project through the grooves $g$, and because these grooves are inclined with respect to the top of the gathering blade, the wisps are pressed downwardly into the notch as they are carried to the ends of the wisp guides.

The forward end of the block or bar 14 abuts against the fibers or bristles in the magazine, and as this block bears firmly and closely against the top of the notched blade, its forward end serves as a shearing edge with which the top surfaces of the jaws of the notch co-operate to make a clean cut through the fibers and to prevent any fibers other than those within the notch from being carried out of the magazine.

The gathering blade carries the wisps against the depending stops 19 and stops with the notch in the blade opposite the depressions 13 in the lower wisp guides. The engagement of a wisp with the stops 19 causes the wisp to be flattened out at the center in a vertical plane, and the wisp then extends across the recesses 13 in the lower wisp guide and in position to be acted upon by the staple driving mechanism.

The mechanism for doubling the wisps to form tufts and for applying the tufts to the brush blocks is, in all essential respects, the same as that disclosed in the Young patent previously referred to with the exception of the manner of mounting the vertically movable guides which carry the staple and tuft to the brush block and into the staple driving device, and in the provision of a yielding part in the connections between the slide which carries said guides and the slide which carries the staple driving rod. The mechanism for forming the staples and feeding them to the staple driving apparatus is the same as in the aforesaid Young patent and therefore is not illustrated in the drawing. The staple driving devices comprise an upper slide E and a lower slide F, movable in guideways 21. The upper slide is connected by a link 22 to a lever 23, which is rocked by the cam wheel 6 to cause the slide E to reciprocate vertically. Upon the slide E is secured a bracket arm 24, which projects laterally from the slide, and said arm carries a pivot pin 25 upon which is mounted an elbow lever 26. One arm $26^a$ of said elbow lever carries a roller which is engaged by a stationary guide H, and the other arm $26^b$ of said lever is pivotally connected to a cross-piece 27, which latter is rigidly connected by a pair of rods 28 to a cross-piece $27^a$, pivoted at $27^b$, to the lower slide F.

A staple driving rod 29 is secured to the upper slide E and extends vertically downward in front of the slide F and between a pair of vertically movable staple guides 30, which depend from the slide F and are formed at their lower ends with a notch $j$ for straddling the wisp of fibers and also with recesses for receiving a staple.

In the present invention, the staple guides 30 are connected to the slide F through a wrist-plate $k$, which is shown in Figs. 17 to 19 as pivoted in an opening 32 in the slide and has pins 33 at opposite sides of its center, which pins project into slots 34 in the staple guides. With this construction, it will be evident that in descending against a brush block, arranged at an angle to the horizontal, the staple guide which first comes in contact with the block will cause the wrist-plate to rock and quickly force the other staple guide into engagement with the block.

The guide H has a guide slot $h$ which is the same in form as that shown in the Young patent; but in the present invention, the wall $h'$ of said slot is made yielding, whereas in the patent referred to the wall is rigid. As shown in the drawing, the wall $h'$ has its upper end mounted upon a pivot 35 and a stiff spring 33 bears against the lower end of said wall and holds it in normal position.

Figure 5:
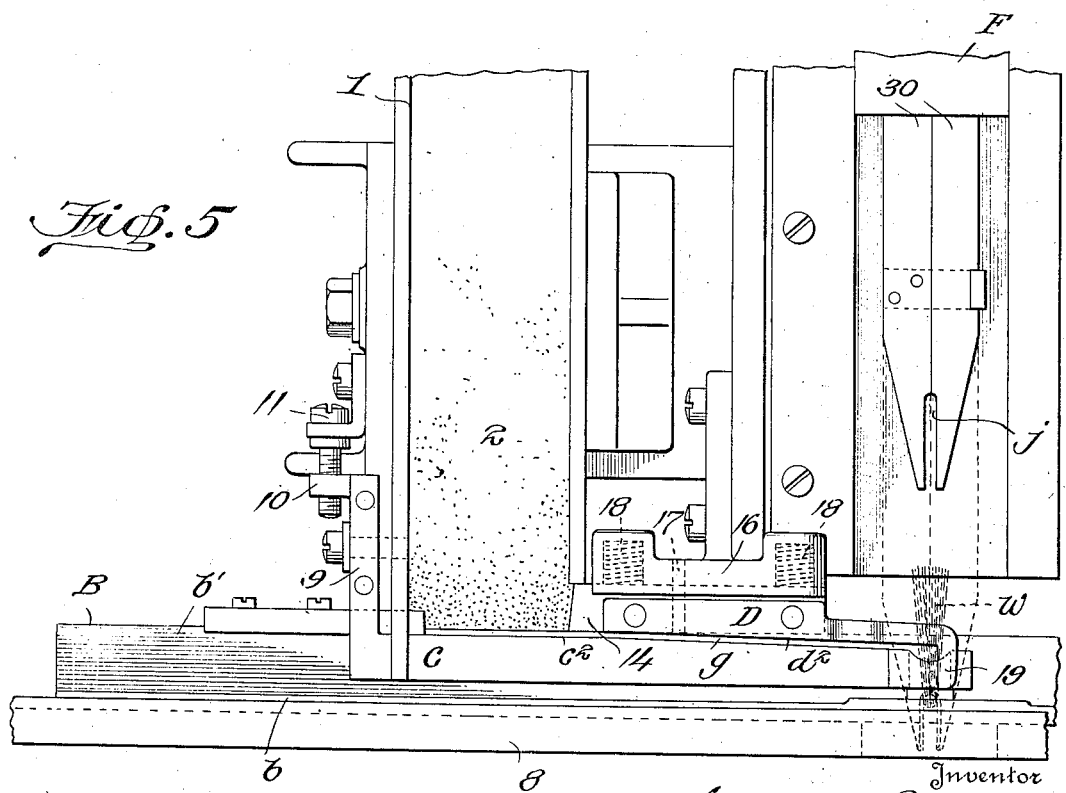
Fig. 5 is a similar view, showing the slide in the delivery position.

When the wisp is carried by the gathering bar to a point directly beneath the stapling device, the upper slide E moves downward. During the first part of this movement the lower slide travels in fixed relation to the upper slide because the form of the slot $h$ is such that the elbow lever 26 cannot rock about its axis. The staple guides place the staple over the central part of the wisp and carry it downward to the brush block, the end portions of the wisp being doubled upwardly around said guides as they leave the recesses 13 in the lower wisp guides, as shown in Fig. 5. About the instant when the staple guides engage a brush block of average thickness, the roller on the elbow lever 26 commences to ride out into the lower inclined portion of the guide slot $h$ and this permits the slide F to be arrested by the brush block while the slide E, which carries the staple driver, moves further and drives the staple into the hole in the brush block, securing the tuft thereto. As the blocks are not of uniform thickness, the part $h'$ of the guideway H is made yielding so that in case the staple guides are arrested by a thick block, $m$, Fig. 2, the outer wall of said slot will yield, as shown in said figure, and permit the elbow lever to rock sufficiently to compensate for the unusual thickness of the block.

What I claim is:

1. In a brush-making machine, the combination with a fiber magazine and staple-driving mechanism, of a reciprocating bar having a notch for gathering wisps from the magazine and conveying them to said mechanism, and guides at the sides of the bar for depressing the wisps in the notch as they are carried toward said mechanism.

2. In a brush-making machine, the combination with a fiber magazine and staple-driving mechanism, of a reciprocating bar having a notch for gathering wisps from the magazine and conveying them to said mechanism, means for depressing the wisps in the notch as they are carried toward said mechanism comprising upper and lower guides arranged at the sides of said bar and having their opposed faces inclined with respect to the top of the bar.

3. In a brush-making machine, the combination with a fiber magazine and staple-driving mechanism, of a reciprocating bar having a notch for gathering wisps from the magazine and conveying them to said mechanism, and guides at the sides of the bar adapted to bear on the wisps while they are being carried to the staple driving mechanism, said guides having downwardly turned ends adapted to be engaged by the wisps when the latter are brought opposite said mechanism.

4. In a brush-making machine, the combination with a fiber magazine and staple-driving mechanism, of a reciprocating bar having a notch for gathering wisps from the magazine and conveying them to said mechanism, lower guides extending on opposite sides of the bar, and upper guides extending over said lower guides and having downwardly turned ends adapted to be engaged by the wisps when the latter are brought opposite said mechanism.

5. In a brush-making machine, the combination with a fiber magazine and staple-driving mechanism, of a reciprocating notched bar for collecting wisps from the magazine and conveying them to said mechanism, lower guides extending at the sides of the bar and having recesses in their upper sides adjacent said mechanism, and upper guides on opposite sides of said bar, said latter guides having end portions extending laterally outward beyond the recessed portions of the lower guides and thence extending downwardly to form stops for the wisps.

6. In a brush-making machine, the combination with a fiber magazine, of a reciprocating bar having a notch with relatively fixed and oppositely inclined jaws adapted to gather wisps from the magazine.

7. In a brush-making machine, the combination with a fiber magazine, of a reciprocating bar having a notch with relatively fixed and oppositely inclined jaws, the face of one of said jaws being convex and the face of the opposing jaw being concave, in cross section.

8. In a brush-making machine, the combination with a fiber magazine, of a reciprocating bar having a notch with relatively fixed and oppositely inclined jaws, the face of one of said jaws being convex and the face of the opposing jaw being concave, in cross section, and the upper end of the latter jaw being inwardly beveled from the sides and top of the bar.

In testimony whereof I affix my signature.

CHARLES E. FISHER.